Feb. 10, 1942. R. F. KNAACK 2,272,978
THERMAL ALARM
Filed May 22, 1940
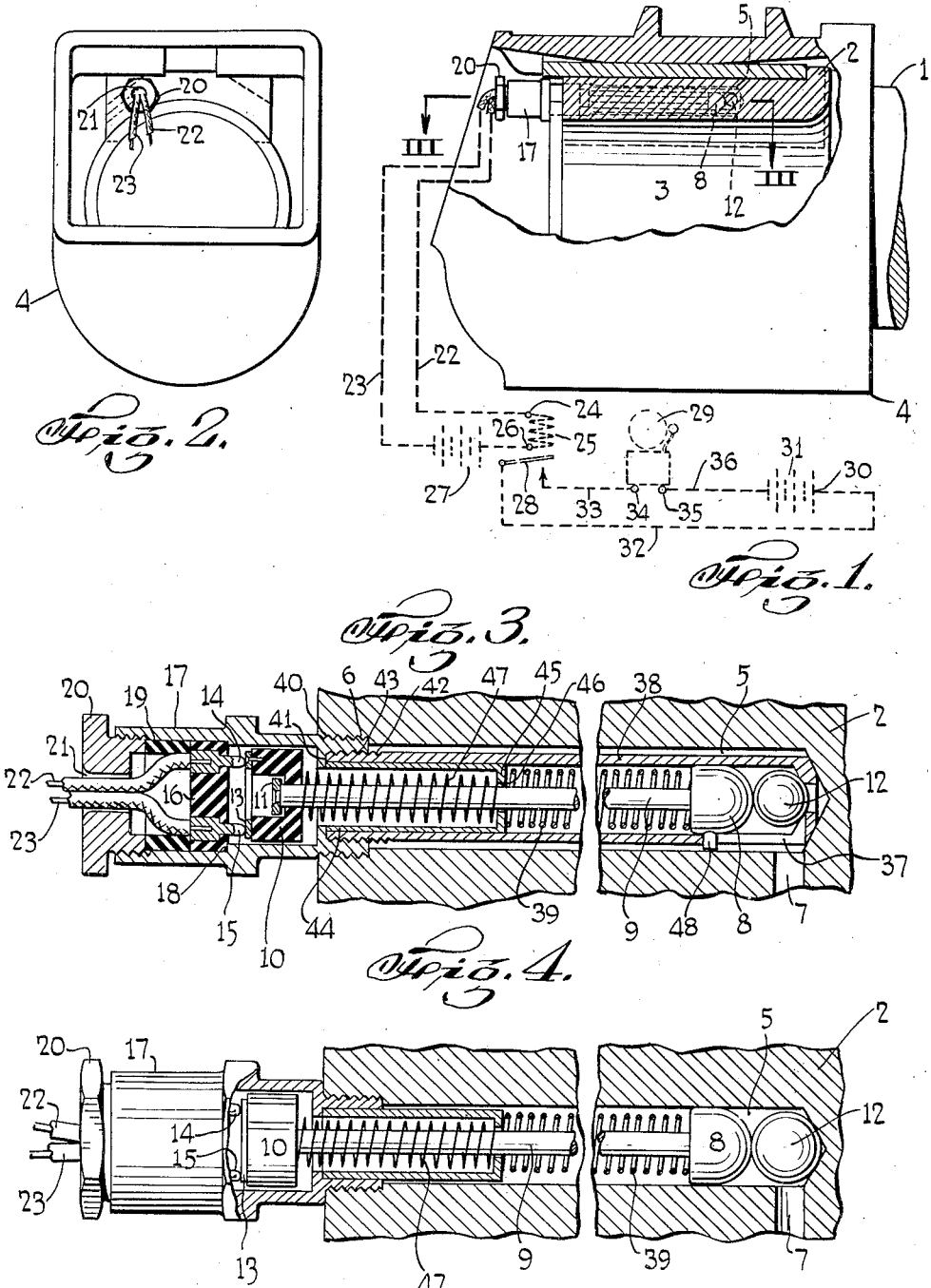

Patented Feb. 10, 1942

2,272,978

UNITED STATES PATENT OFFICE 2,272,978

THERMAL ALARM

Rudolph F. Knaack, Menands, N. Y., assignor to Consolidated Car Heating Company, Inc., Albany, N. Y., a corporation of New York Application May 22, 1940, Serial No. 336,505

2 Claims. (Cl. 200—142)

This invention relates to heat responsive devices, particularly heat responsive devices designed to give an alarm upon an undesired rise in temperature, and more especially such devices especially applicable for giving an alarm upon overheating occurring in a journal, journal bearing, or journal box.

A principal object of this invention is the provision of a device of the type specified which will be extremely simple in construction, inexpensive to manufacture, adapted to be installed in place with the minimum of changes in the device to which it is applied, permanent in adjustment, and free from undue maintenance requirements.

Other objects and advantages will appear as the description of the particular physical embodiments selected to illustrate the invention progresses and the novel features will be particularly pointed out in the appended claims.

In describing the particular physical embodiments selected to illustrate the invention, reference will be had to the accompanying drawing and the characters of reference thereon in which like characters of reference designate like parts throughout the several views, and in which:

Figure 1 is a fragmentary elevational view of a journal, journal bearing, and journal box, with some parts broken away to more clearly show the construction, to which has been applied one form of applicant's hot box indicator or alarm; Fig. 2 is an end view of the device as shown by Fig. 1; Fig. 3 is a horizontal cross-sectional view on the plane indicated by the line III—III of Fig. 1 viewed in the direction of the arrows at the ends of the line; Fig. 4 is a view corresponding to Fig. 3 but illustrative of a modified form of applicant's device.

Mechanical engineers are well aware that journals and the bearings thereof frequently become unduly heated from many causes, especially the lack of oil. In many situations such heating is extremely dangerous. This is especially so in the case of the journals and the journal bearings which are formed on the ends of railway car axles. For this reason, applicant has illustrated his hot box alarm in connection with a railway car axle.

In Fig. 1, numeral 1 designates the ordinary and well known railway car axle. 2 indicates the ordinary and well-known, so-called, bearing brass. This member 2 is made of any suitable or appropriate anti-friction metal and when worn is replaceable. This member 2 is the real journal bearing, bearing directly upon the portion 3 of the axle 1 which forms the journal thereof.

4 designates as a whole the so-called box.

All of the parts so far described are all well known and intended to represent conventional construction.

If, due to lack of oil or other causes, heat is generated within the box 4, the seat thereof is the contacting surfaces between the journal 3 and the bearing 2. If this heat becomes excessive it may melt the bearing and set fire to the contents of the box 4 which are usually oil soaked cotton waste and this in turn might well set fire to the car which is supported by the axle 1.

Applicant's alarm may be positioned in a variety of places but applicant considers the most desirable position for his alarm to be within the cavity in the bearing 2. To this end, in applying his device, he first forms a cavity 5 in the bearing 2. For the purpose of applicant's particular form of alarm as illustrated in Figs. 1 to 4 inclusive it is necessary to form the cavity in the bearing member 2 of two diameters. The larger portion of the cavity, that is, the portion as shown to the right, as viewed in Fig. 3, is of one diameter and smaller than the diameter of that portion somewhat to the left. This portion of the cavity is of larger diameter and is formed with a screw thread as shown at 6. The cavity 5 at its inner end is connected with an outlet bore 7 as well shown in Fig. 4 and also shown in Fig. 1. This outlet bore 7 is, as will be hereinafter more fully pointed out, for the purpose of furnishing an outlet for molten metal.

Applicant's alarm device proper includes a piston or plunger 8 fastened in any suitable or appropriate manner as by inter-engaging screw threads upon a piston rod 9. The piston rod 9, of the form shown in Fig. 3, passes loosely through the electrical conducting ring support 10 but is provided on its end with an enlarged head 11 so that the piston rod 10 may move to the left, as viewed in Fig. 3, without moving the conducting ring support 10, but when it moves to the right the full distance allowed by the melting of the pellet 12, the piston rod head 11 contacts with the conducting ring support 10 and moves it to the right, as viewed in Fig. 3 thereby moving the electrical conducting ring 13 out of contact with the conducting terminals 14 and 15.

The two electrical conducting terminals 14 and 15 are positioned in and supported by an insulating block 16. This block 16 fits within a head 17 which head is provided with a shoulder 18 against which the block rests and against which the block is pressed by the insulating annulus or ring 19 which also fits within the head 17 and which is pressed against the insulating block 16 by the externally threaded closing cap 20 which threads into the outer end of the head 17.

The externally threaded closing cap 20 is formed with an orifice 21, preferably centrally disposed thereof, through which are carried the electrical conducting wires 22 and 23, one being connected to the electrical conducting terminal 14 and the other to the electrical conducting terminal 15.

One wire 22 is connected to one terminal 24 of a relay 25, the other terminal 26 of the relay being connected to the one side of a battery 27 and the other side of the battery 27 being connected by wire 23. Just so long as electrical conducting ring 13 is in contact with electrical conducting terminals 14 and 15 the relay 25 is energized and armature 28 is held in the raised position, as shown, but any movement of rod 9 to the right, as viewed in Fig. 3, causes electrical conducting ring 13 to break contact with electrical conducting terminals 14 and 15 and so de-energizing relay 25, whereupon armature 28 drops on its back point and so a circuit is formed through the bell 29 as follows: one terminal 30 of the battery 31, wire 32, armature 28, wire 33, one terminal 34 of bell 29, the other terminal 35 of bell 29, wire 36, and to the other terminal of battery 31. When the last traced circuit is formed the bell 29 rings and gives the alarm.

Ordinarily rod 9 is in the position as shown in Fig. 3 but when the journal bearing becomes overheated the fusible pellet 12 melts and runs out through the slot 37 in liner 38. When pellet 12 melts, coil spring 39 moves head 8 and rod 9 to the right, as viewed in Fig. 3, and so moves the conducting ring support 10 together with the conducting ring 13 to the right, as viewed in Fig. 3, and so separates the conducting ring from the electrical conducting terminals 14 and 15 and maintains the separation until replaced manually.

For convenience in mounting and assembling, head 17 is provided having an external thread at 40 to cooperate with the internal thread 6 of the bearing.

Head 14 is also provided with an annular shoulder 41 against which rests the liner 38. This liner 38 has an external thread 42 on its end which cooperates with the internal thread 43 on the inner end of the head 17.

The annular shoulder 41 is wide enough so as to form a seat for spring abutment 44. This spring abutment is made in the form of a long sleeve, one end of which rests against annular shoulder 41 and the other end of which is provided with an end wall 45 provided with a through bore 46 through which rod 9 extends.

Spring 39 bears at one end against the head 8 and at the other end against wall 46 and as spring abutment 44 rests against annular shoulder 41 spring 39 is effective to push head 8 to the right when it is free to be pushed.

In order that a spring pressure and not an unyielding force shall be exerted against ring block 10, a spring 47 is interposed between the block 10 and the inner side of end wall 46. This spring 47 keeps the block 10 pushed toward the left, as viewed in Fig. 3, but it is a weaker spring than spring 39 so that when the pellet 12 is fused, spring 39 is sufficient to move the head 8, rod 9 and block 10 to the right, as viewed in Fig. 3.

After pellet 12 has melted, head 17 is removed from the cavity in the journal and then the head 8 is moved to the left as viewed in Fig. 3, by means of the manual pin 48 and a new pellet, as 12, is slipped in through the slot 37 to hold the head in its moved position whereupon the whole assembly is again inserted into the cavity 5 and the head 17 screwed back into place and the device is ready for another operation.

The pellet 12 may be made of any suitable or appropriate material and may be of any suitable or appropriate form, it merely being sufficient for it to melt at the temperature above which it is not desired to have the journal go.

No particular specification as to the position or nature of the warning signal 29 is meant to exclude its position at any desired selected place or to exclude the use in place thereof of any other appropriate or desired audible or visible, or other electrical or operating means.

The form of device as shown in Fig. 4 corresponds to the device as shown in Fig. 3 except that the internal liner 33 has been dispensed with.

From the above description it will be seen that applicant has provided a simple, easily constructed and installed hot journal alarm which is easy to maintain and easy to manipulate and which gives a positive alarm. In the form shown, the device is what is known as a closed circuit device in that the alarm is sounded only when the circuit is opened.

Although applicant has particularly described several specific physical embodiments of the idea of means underlying his invention, nevertheless, it is desired to have it understood that the particular forms selected are merely illustrative but do not exhaust the possible physical embodiments of the idea of means underlying the invention.

What is claimed as new and desired to secure by Letters Patent of the United States, is:

1. A circuit controlling element of an alarm device for bearings, in combination: a fusible pellet, a plunger in contact with said pellet; a fixed abutment; a spring positioned between the fixed abutment and the plunger acting to force the plunger toward the pellet; a rod connected to the plunger; an electrical conducting ring; an insulating support for said ring formed with a rod orifice, said rod passing through said orifice and said rod formed with a head whereby said insulating support may be moved in one direction by said rod; an electric contact positioned to cooperate with the electrical conducting ring; a spring between said insulating support and said fixed abutment, said spring being weaker than the first mentioned spring; whereby when the pellet is intact electrical contact is made between the electrical conducting ring and the electrical contact and upon the melting of the fusible pellet the first mentioned spring moves the plunger and causes a break between the electrical conducting ring and the said electrical contact.

2. A circuit controlling element of an alarm for bearings, in combination: a hollow liner formed with a slot in the wall thereof adjacent one end; a plunger formed with a manually operable pin extending through the wall of the hollow liner; a rod connected to the plunger; a spring surrounding the rod; a fixed abutment at one end of the spring; said spring bearing against the fixed abutment at one end and against the plunger at the other end whereby the plunger may be manually operated by compressing the spring; a pellet insertable through the slot when the spring has been compressed manually and which retains the spring in compressed condition after being put in place in the end of the hollow stem through the slot; and means controlled by the rod for controlling circuit when the pellet melts.

RUDOLPH F. KNAACK.